United States Patent
Tsujimoto et al.

(10) Patent No.: US 10,254,444 B2
(45) Date of Patent: Apr. 9, 2019

(54) ANTI-GLARE FILM, POLARIZER AND IMAGE DISPLAY DEVICE

(75) Inventors: Jun Tsujimoto, Tokyo (JP); Aya Naitou, Tokyo (JP); Yukihiro Doumori, Tokyo (JP); Takashi Narikawa, Tokyo (JP); Takashi Kodama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 14/234,310

(22) PCT Filed: Jul. 25, 2012

(86) PCT No.: PCT/JP2012/068879
§ 371 (c)(1),
(2), (4) Date: Mar. 7, 2014

(87) PCT Pub. No.: WO2013/015332
PCT Pub. Date: Jan. 31, 2013

(65) Prior Publication Data
US 2014/0177052 A1    Jun. 26, 2014

(30) Foreign Application Priority Data
Jul. 26, 2011 (JP) .................................. 2011-163692

(51) Int. Cl.
*G02B 1/11* (2015.01)
*G02B 5/02* (2006.01)
(Continued)

(52) U.S. Cl.
CPC .............. *G02B 1/11* (2013.01); *G02B 5/0221* (2013.01); *G02B 5/0226* (2013.01);
(Continued)

(58) Field of Classification Search
CPC .. G02B 1/11–1/118; G02B 5/02–5/021; G02B 5/0221; G02B 5/0236–5/0242;
(Continued)

(56) References Cited

U.S. PATENT DOCUMENTS 6,921,578 B2 * 7/2005 Tsujino et al. ................. 428/428
7,906,207 B2 * 3/2011 Suzuki .................... G02B 1/111
    106/287.24
(Continued)

FOREIGN PATENT DOCUMENTS

CN    101006367    7/2007
CN    101010602    8/2007
(Continued)

Primary Examiner — Stephone B Allen
Assistant Examiner — Adam W Booher
(74) Attorney, Agent, or Firm — Hamre, Schumann, Mueller & Larson, P.C.

(57) ABSTRACT

The claimed invention provides an anti-glare film which has high pencil hardness and high scratch resistance along with crack prevention, and also has high image contrast and excellent anti-glare property. Provided is an anti-glare film including a light transmitting substrate, and an anti-glare layer having surface roughness on at least one surface of the light transmitting substrate. The anti-glare layer includes chain-like inorganic fine particles which have an area ratio of 30 to 94% in the thickness direction cross section of the anti-glare layer.

20 Claims, 3 Drawing Sheets

(51) Int. Cl.
  *G02B 5/30* (2006.01)
  *G02F 1/1335* (2006.01)
(52) U.S. Cl.
  CPC ............ *G02B 5/0242* (2013.01); *G02B 5/30* (2013.01); *G02F 1/133502* (2013.01); *G02F 2201/50* (2013.01)
(58) Field of Classification Search
  CPC ... G02B 5/0268–5/0278; G02B 5/0294; G02B 5/30; G02B 5/3025–5/3058; G02F 1/133502; G02F 1/133504; G02F 1/133528–1/133536; G02F 2001/133531–2001/13355; B32B 5/14; B32B 5/145; B32B 19/02; B32B 27/28–27/40
  See application file for complete search history.

(56) References Cited

U.S. PATENT DOCUMENTS

| | | | | |
|---|---|---|---|---|
| 2005/0255291 | A1* | 11/2005 | Iwata | C08J 7/04 428/141 |
| 2006/0057344 | A1* | 3/2006 | Sakurai et al. | 428/212 |
| 2006/0286395 | A1* | 12/2006 | Goto | B32B 27/36 428/480 |
| 2007/0247710 | A1 | 10/2007 | Nakashima et al. | |
| 2009/0075074 | A1* | 3/2009 | Horio et al. | 428/341 |
| 2010/0103523 | A1* | 4/2010 | Fukui et al. | 359/581 |
| 2010/0196687 | A1* | 8/2010 | Isono | G02F 1/133502 428/220 |
| 2012/0189828 | A1 | 7/2012 | Inomata et al. | |
| 2013/0273354 | A1 | 10/2013 | Horio | |

FOREIGN PATENT DOCUMENTS

| | | | |
|---|---|---|---|
| CN | 101251608 | 8/2008 | |
| CN | 101738650 | 6/2010 | |
| CN | 103080778 | 5/2013 | |
| JP | 6-018706 | 1/1994 | |
| JP | 10-020103 | 1/1998 | |
| JP | 2000-112379 | 4/2000 | |
| JP | 2005-209431 | 8/2005 | |
| JP | 2005-316413 | 11/2005 | |
| JP | 2006-056136 | 3/2006 | |
| JP | 2008-180852 | 8/2008 | |
| JP | 2008-203836 | 9/2008 | |
| JP | 2008-233870 | 10/2008 | |
| JP | 2010-157438 | 7/2010 | |
| JP | 2010-249964 | 11/2010 | |
| JP | 2011-068122 | 1/2011 | |
| JP | 2011-126279 | 6/2011 | |
| JP | 2011-128408 | 6/2011 | |
| KR | 10-2010-0073252 | 7/2010 | |
| WO | 2006/025992 | 3/2006 | |
| WO | 2009/041321 | 4/2009 | |
| WO | 2010/071010 | 6/2010 | |
| WO | WO 2010125834 A1 * | 11/2010 | ............ G02B 5/305 |
| WO | 2011/016306 | 2/2011 | |

* cited by examiner

ANTI-GLARE FILM, POLARIZER AND IMAGE DISPLAY DEVICE

TECHNICAL FIELD

The claimed invention relates to an anti-glare film, a polarizer and an image display device.

BACKGROUND ART

Image display devices such as cathode ray tube display devices (CRTs), liquid crystal displays (LCDs), plasma displays (PDPs), electroluminescence displays (ELDs), touch panels, electronic paper displays, and tablet computers are generally provided with an optical layered body for antireflection on the outermost surface. Such optical layered bodies for antireflection suppress reflection of images and reduce the reflectance by scattering or interference of light.

Known as one of optical layered bodies for antireflection is an anti-glare film in which an anti-glare layer with surface roughness is formed on a transparent substrate. The surface roughness on the anti-glare film scatters natural light and thus prevents a decrease in visibility due to reflection of natural light and of images.

Examples of such anti-glare films include a film having an anti-glare layer with surface roughness formed by aggregation of particles like cohesive silica; a film having surface roughness on a surface of an anti-glare layer formed by adding an organic filler to a resin, the particle size of the filler being equal to or greater, and/or equal to or smaller than the film thickness of a coating; a film with surface roughness on a surface of an anti-glare layer formed by phase separation of a resin; and a film produced by lamination of a film with surface roughness to transfer projections and depressions (e.g., Patent Literatures 1, 2).

Such anti-glare films require a certain hardness in addition to the mentioned anti-glare property, and preferably have a hardness equal to or higher than "H" of the pencil hardness test specified in JIS K5600-5-4 (1999), for example. Such anti-glare films with a high hardness are known to be produced by forming an anti-glare layer containing silica particles (Patent Literature 3).

On the other hand, liquid crystal displays with high definition are recently developed, which require higher performance of anti-glare films. Particularly required are a film achieving, in addition to excellent anti-glare property and optical characteristics, crack prevention during production like post-processing, and having a thin anti-glare layer achieving light weight and cost reduction. A thinner anti-glare layer, however, reduces the hardness of the anti-glare layer which serves as a hard coat layer. Accordingly, required is a film having both hardness and crack prevention.

In a conventional method of adding particles like silica to an anti-glare layer, a transparent substrate and an anti-glare layer need to be thick for sufficiently enhancing the hardness (pencil hardness and scratch resistance) of the hard coat of the anti-glare layer, whereby failing to achieve sufficient crack prevention. Enhancing the hardness of the hard coat of the anti-glare layer without increasing the film thickness of the substrate and of the anti-glare layer requires adding an excessive amount of silica particles. This, however, causes loss of adhesion to the substrate, insufficient crack prevention due to compatibility of hardness and fragileness, and poor blackness visibility due to reduced light transmittance of the anti-glare film, in other words, deterioration of image contrast. In addition, the anti-glare layer fails to obtain the desired rough surface and good anti-glare property.

CITATION LIST

Patent Literature

Patent Literature 1: JP H6-18706 A
Patent Literature 2: JP H10-20103 A
Patent Literature 3: JP 2000-112379 A

SUMMARY OF INVENTION

Technical Problem

The claimed invention aims to, with the above problems taken into consideration, provide an anti-glare film which has high pencil hardness and high scratch resistance along with crack prevention, and also has high image contrast and excellent anti-glare property.

Solution to Problem

The claimed invention provides an anti-glare film including a light transmitting substrate, and an anti-glare layer with surface roughness on at least one surface of the light transmitting substrate, the anti-glare layer containing chain-like inorganic fine particles which have an area ratio of 30 to 94% in a thickness direction cross section of the anti-glare layer.

The area ratio of the chain-like inorganic fine particles in the thickness direction cross section of the anti-glare layer is preferably 40 to 80%.

The filling rate of the chain-like inorganic fine particles in the anti-glare layer is preferably 40 to 150%.

The chain-like inorganic fine particles are preferably made of 3 to 20 spherical inorganic fine particles having an average primary particle size of 1 to 90 nm, connected with one another to form a chain.

The chain-like inorganic fine particles are preferably chain-like silica.

The anti-glare layer is preferably a single layer.

The anti-glare layer preferably has a film thickness of 3 to 10 μm.

The anti-glare layer preferably further includes a filler in an amount of 5 to 25% by mass.

The filler is preferably at least one selected from the group consisting of styrene-acrylic copolymer beads, polystyrene beads, and acrylic beads.

The claimed invention also provides a polarizer containing a polarizing element, including the anti-glare film on the surface of the polarizing element.

The claimed invention further provides an image display device including the anti-glare film or the polarizer.

The claimed invention is described in detail below.

The anti-glare film of the claimed invention includes a light transmitting substrate, and an anti-glare layer with surface roughness on at least one surface of the light transmitting substrate, and the anti-glare layer contains a certain amount of chain-like inorganic fine particles.

This enables production of an anti-glare film excellent in pencil hardness, scratch resistance, anti-glare property, and image contrast.

The anti-glare layer of the anti-glare film of the claimed invention contains a certain amount of chain-like inorganic fine particles. In an anti-glare layer containing chain-like inorganic fine particles, the inorganic fine particles tend to aggregate on the layer surface, compared to conventional anti-glare layers containing spherical inorganic fine particles. This configuration enhances the scratch resistance of the anti-glare layer. Inorganic fine particles generally have a higher specific gravity than a resin matrix which forms an anti-glare layer. Spherical particles thus tend to sink in the bottom of the anti-glare layer because of their smaller surface area, whereby having difficulty in forming such a configuration. In contrast, the chain-like inorganic fine particles may keep uniform dispersion in a resin because of their chain shape even when the resin has a composition state. Accordingly, during application of a resin composition or during drying a solvent, the chain-like inorganic fine particles, having a larger surface area, may move to the upper phase of the layer along with the movement of the solvent toward the surface of a coating. Such a coating cures into a layer. Thus, chain-like inorganic fine particles may presumably aggregate on the surface of the layer. Furthermore, the particles are not discretely present, but are chemically bonded to one another to form a chain. Accordingly, when the particles rise to the upper phase and the resin is cured, some particles tend to stick out of the coating surface, which may presumably improve the scratch resistance of the coating surface.

Chain-like inorganic fine particles having a low refractive index, such as chain-like silica, presumably reduce the refractive index of the layer surface and the reflection of natural light to improve the blackness visibility. Additionally, chain-like inorganic fine particles achieve a relatively high viscosity of a composition for an anti-glare layer for forming an anti-glare layer, whereby enabling easier formation of the desired surface roughness and excellent anti-glare property.

The layer surface of the anti-glare layer of the claimed invention refers to a region not including the outermost layer surface and the lowermost layer surface on the substrate side, and being 200 nm away from the outermost and lowermost layer surface.

If the chain-like inorganic fine particles are inorganic fine particles such as silica, having a lower refractive index than a matrix resin of the anti-glare layer, only the chain-like fine particles tend to be densely present on the outermost layer surface, as if a low-refractive-index layer, having a film thickness of about the average particle diameter of the chain-like fine particles, was formed (FIGS. 1 to 4). This presumably further reduces the reflectance of the anti-glare layer. Although the anti-glare layer is a single layer, it contains the chain-like inorganic fine particles at a high filling rate. This enables formation of a pseudo low-refractive-index layer on the outermost, which is another characteristic of the claimed invention.

In the anti-glare film of the claimed invention, the chain-like inorganic fine particles have an area ratio of 30 to 94% in the thickness direction cross section of the anti-glare layer. That is, the chain-like inorganic fine particles are densely filled in the anti-glare layer of the anti-glare film of the claimed invention. The anti-glare layer containing the chain-like inorganic fine particles in such a specific state may enhance the scratch resistance as well as the pencil hardness. When the anti-glare film of the claimed invention having the chain-like inorganic fine particles filled in the anti-glare layer in the mentioned state is disposed on a display screen, the chain-like inorganic fine particles cause the following effects. If the chain-like inorganic fine particles are chain-like inorganic fine particles with a lower refractive index, such as chain-like silica, the fine particles lower the refractive index of the whole anti-glare layer and the reflectance of the anti-glare film, compared to a film not containing the chain-like inorganic fine particles. In addition, the image contrast thus may be enhanced. If the chain-like inorganic fine particles are chain-like hollow silica, the refractive index may be further reduced, further improving the contrast. If the chain-like inorganic fine particles are chain-like ATO particles, contact points of the particles may be increased with a small amount of the ATO particles, which is effective to improve conductivity.

The chain-like inorganic fine particles are preferably dispersed with some particles being connected one another in the anti-glare layer. This specific dispersion state of the chain-like inorganic fine particles may increase the pencil hardness and the scratch resistance.

The phrase "the chain-like inorganic fine particles are dispersed with the anti-glare layer" means that the chain-like inorganic fine particles are densely present in the anti-glare layer (satisfy the area ratio mentioned below), and more preferably, the chain-like inorganic fine particles form aggregates (50 to 200 sq. nm) in the anti-glare layer and these aggregates are in contact with one another to form a reticular structure or the like.

In these aggregates (50 to 200 sq. nm), the inorganic fine particles may be linearly extended or curved in two or three dimensions. These shapes satisfy the definition of the chain-like inorganic fine particles of the claimed invention, that is, 3 to 20 spherical inorganic fine particles with an average primary particle size of 1 to 90 nm are connected with one another to form a chain.

Figure 1:
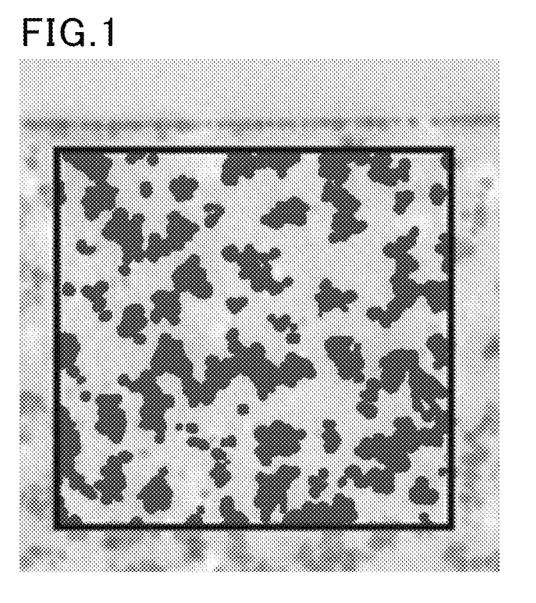
FIG. 1 shows a SEM photograph of the thickness direction cross section of the anti-glare layer of the anti-glare film in Example 1, in which a certain area is binarized.
Figure 2:
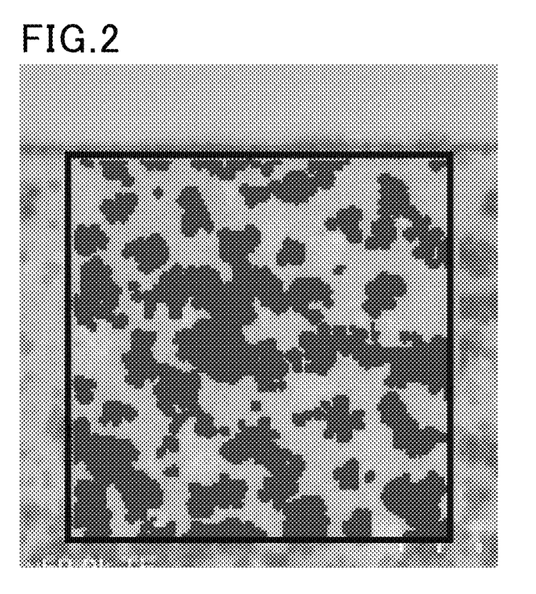
FIG. 2 shows a SEM photograph of the thickness direction cross section of the anti-glare layer of the anti-glare film in Example 2, in which a certain area is binarized.
Figure 3:
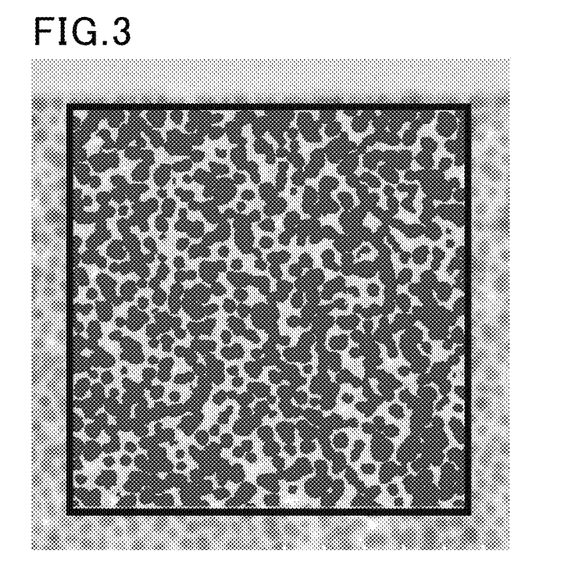
FIG. 3 shows a SEM photograph of the thickness direction cross section of the anti-glare layer of the anti-glare film in Example 5, in which a certain area is binarized.
Figure 4:
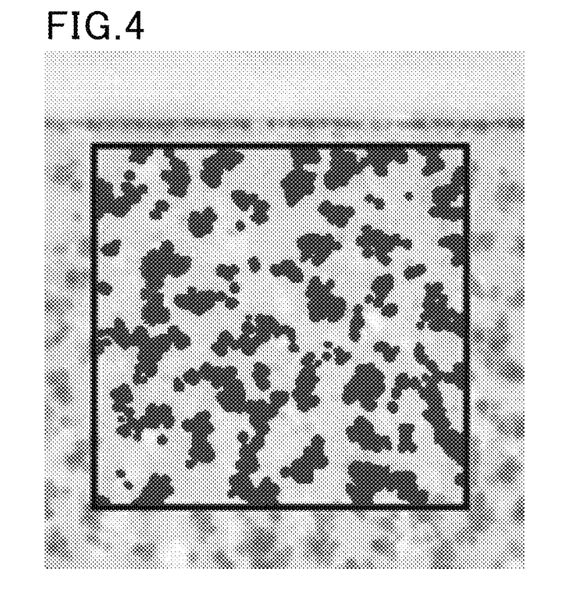
FIG. 4 shows a SEM photograph of the thickness direction cross section of the anti-glare layer of the anti-glare film in Comparative Example 3, in which a certain area is binarized.

Thus, the phrase means not that the chain-like inorganic fine particles are not densely present in the anti-glare layer (do not satisfy the area ratio) or that the chain-like inorganic fine particle aggregates are sparsely present (do not satisfy the area ratio and the aggregates are apart from one another without connection, as shown in FIG. 4), but that the chain-like inorganic fine particles satisfy the area ratio as shown in FIG. 1, and preferably that the chain-like inorganic fine particles satisfy the area ratio and the chain-like inorganic fine particles or the aggregates of the particles are in contact with one another as shown in FIGS. 2 and 3.

The dispersion state of the chain-like inorganic fine particles in the anti-glare layer may be seen in observation of the thickness direction cross section of the anti-glare layer using a SEM or the like.

The anti-glare film of the claimed invention may also provide some functions such as excellent pencil hardness, excellent scratch resistance, excellent anti-glare property, and excellent contrast. The anti-glare layer is preferably a single layer. The mentioned dispersion state of the chain-like inorganic fine particles in the anti-glare layer enables production of an anti-glare film with a small thickness and these functions.

The chain-like inorganic fine particles are inorganic fine particles connected with one another to form a chain.

Specifically, in the chain-like inorganic fine particles, 3 to 20 spherical inorganic fine particles with an average primary particle size of 1 to 100 nm are preferably connected with one another to form a chain.

If the average primary particle size and the number of the chain-like inorganic fine particles are out of this range, the resulting anti-glare layer may fail to have sufficient pencil hardness.

The chain-like inorganic fine particles may be linearly extended or curved in two or three dimensions.

Since the chain-like inorganic fine particles are densely filled in the anti-glare layer, more than 20 spherical inorganic fine particles connected with one another may be observed in a cross section of the anti-glare film of the claimed invention. Thus, the chain-like inorganic fine particles are usually found as 3 or more of spherical inorganic fine particles connected with one another to form a chain in the cross section of the anti-glare film of the claimed invention. The average primary particle size in the claimed invention means the average particle size of any ten spherical fine particles forming the chain-like inorganic fine particles observed in the cross section of the film using a SEM or the like.

Examples of the chain-like inorganic fine particles include chain-like silica, chain-like ATO particles, and chain-like hollow silica. Preferably among these is chain-like silica.

The chain-like silica means a type of silica in which fine particles are connected with one another to form a chain, and the particles may be linearly extended or curved in two or three dimensions.

Examples of the commercial product of the chain-like silica include V-8803 produced by JGC Catalysts and Chemicals Ltd.

The chain-like ATO particles enable the resulting anti-glare film to have appropriate antistatic property in addition to high pencil hardness and high scratch resistance.

The chain-like hollow silica may reduce the refractive index of the whole anti-glare layer to lower the reflectance of the anti-glare film.

In the anti-glare film of the claimed invention, the chain-like inorganic fine particles have an area ratio of 30 to 94% in the thickness direction cross section of the anti-glare layer. The area ratio refers to a proportion of the area occupied by the chain-like inorganic fine particles in a certain area in the thickness direction cross section of the anti-glare layer.

An area ratio of lower than 30% causes insufficient pencil hardness and insufficient scratch resistance. The lower limit of the area ratio is preferably 40% to achieve more excellent pencil hardness.

An area ratio of more than 94% causes reduced adhesion between the anti-glare layer and the light transmitting substrate and fragileness of the anti-glare film of the claimed invention while increasing the hardness thereof. The anti-glare film thus tends to have cracks or the like during production or use. Additionally, such an area ratio makes production of the anti-glare layer difficult, and furthermore leading to increase in production cost. The upper limit of the area ratio is preferably 80% to prevent cracks.

The area ratio may be obtained by binarizing (converting the abundance of the chain-like fine particles in terms of areas) the image of the cross-sectional SEM photograph using an image analysis software Win Roof (produced by Visual System Division of MITANI CORPORATION).

The area ratio may be measured in the following way, for example:

(1) Cross-Sectional SEM Photograph

An optical layered body is cut with a microtome to prepare an ultrathin section sample, and a cross-sectional SEM photograph of the sample is taken at a 50000× magnification (acceleration voltage: 30.0 kV, emission current: 10 µA) using a digital scanning electron microscope (S-4800) produced by Hitachi Power Solutions Co., Ltd. (2) Determination of area ratios From the digital data of the cross-sectional SEM photograph, the image is binarized using an image analysis software Win Roof (produced by Visual System Division of MITANI CORPORATION) for calculation of the area ratio.

The cross-sectional SEM photograph shows chain-like inorganic fine particles. The part of the chain-like inorganic fine particles is selected and colored (binarized) using the software and then the area of the selected part is calculated.

In the anti-glare film of the claimed invention, the chain-like inorganic fine particles have a filling rate of preferably 40 to 150% in the anti-glare layer.

A filling rate of less than 40% may fail to achieve sufficient pencil hardness and sufficient scratch resistance of the anti-glare layer. In addition, the blackness visibility and the controlling effect of the desired surface roughness may be poor. A filling rate of more than 150% excessively reduces the rate of binder resin, possibly reducing the adhesion to the substrate. The lower limit of the filling rate of the chain-like inorganic fine particles is more preferably 50%, and the upper limit thereof is more preferably 90%.

The filling rate refers to the percentage (B/A) of the mass of the chain-like inorganic fine particles (B) to the mass of the resin (A) in the anti-glare layer.

The binder resin used for the anti-glare layer is preferably a transparent binder resin, and examples thereof include an ionizing radiation-curable resin which is cured by UV irradiation or electron beam irradiation; a mixture of an ionizing radiation-curable resin and a solvent-drying resin (a resin which forms a coating by only drying the resin to remove a solvent added to adjust the solid content, such as a thermoplastic resin); and a thermosetting resin. More preferable among these is the ionizing radiation-curable resin. In the present description, the concept of "resin" includes resin components such as monomer, oligomer, and polymer.

Examples of the ionizing radiation-curable resin include compounds having one or more unsaturated bonds, for example, compounds having acrylate reactive functional groups. Examples of the compound having one unsaturated bond include ethyl(meth)acrylate, ethylhexyl(meth)acrylate, styrene, methylstyrene, and N-vinyl pyrrolidone. Examples of the compound having two or more unsaturated bonds include polyfunctional compounds such as polymethylolpropane tri(meth)acrylate, hexanediol(meth)acrylate, tripropylene glycol di(meth)acrylate, diethylene glycol di(meth)acrylate, pentaerythritol tri(meth)acrylate, trimethylolpropane triacrylate, pentaerythritol tetraacrylate, dipentaerythritol pentaacrylate, dipentaerythritol hexa(meth)acrylate, 1,6-hexanediol di(meth)acrylate, and neopentyl glycol di(meth)acrylate; and reaction products of the poly-functional compounds with (meth)acrylates (e.g., a poly (meth)acrylate ester of a polyhydric alcohol). The term "(meth)acrylate" as used herein indicates methacrylate and acrylate. In the claimed invention, particularly preferable are compounds containing a tri- or poly-functional unsaturated bond. Specific examples are pentaerythritol tri(meth)acrylate and dipentaerythritol hexa(meth)acrylate.

In addition to the above compounds, resins having an unsaturated double bond and a comparatively low-molecular weight, such as polyester resins, polyether resins, acrylic resins, epoxy resins, urethane resins, alkyd resins, spiroacetal resins, polybutadiene resins, and polythiol-polyene resins, may be used as the ionizing radiation-curable resin.

The ionizing radiation-curable resin may be used in combination with a solvent-drying resin. The combination use with a solvent-drying resin may effectively prevent coating defects of an application surface, and thereby may achieve excellent anti-glare property. The solvent-drying resin usable in combination with the ionizing radiation-curable resin is not particularly limited, and typically used is a thermoplastic resin.

Examples of the thermoplastic resin include, but are not particularly limited to, styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, and rubbers and elastomers. The thermoplastic resin is preferably non-crystalline and soluble in an organic solvent (particularly a common solvent dissolving a plurality of polymers or curable compounds). From the viewpoint of film forming properties, transparency, and weather resistance, styrene resins, (meth)acrylic resins, alicyclic olefin resins, polyester resins, and cellulose derivatives (e.g., cellulose esters) are particularly preferred.

Examples of the thermosetting resin usable as the binder resin include phenolic resins, urea resins, diallyl phthalate resins, melamine resins, guanamine resins, unsaturated polyester resins, polyurethane resins, epoxy resins, amino alkyd resins, melamine-urea co-condensation resins, silicon resins, and polysiloxane resins.

Preferable as the binder resin among these is a mixture of the pentaerythritol tri(meth)acrylate and an acrylic resin containing methacrylic acid in terms that the chain-like inorganic fine particles tend to be connected with one another in the coating.

The anti-glare layer preferably contains a filler.

A filler enables formation of surface roughness on the anti-glare layer, and may provide anti-glare property by light diffusion and internal scattering.

The filler consists of fine particles, and the shape of which may be, but not particularly limited to, spherical, ellipsoidal, or amorphous. The filler may consist of inorganic or organic fine particles, and preferably consists of transparent fine particles.

Specific examples of the organic filler are plastic beads. Examples of the plastic beads include polystyrene beads (refractive index: 1.59 to 1.60), benzoguanamine-melamine-formaldehyde condensates (refractive index: 1.66), acrylic beads (refractive index: 1.49), styrene-acrylic copolymer beads (refractive index: 1.50 to 1.58), benzoguanamine-formaldehyde condensate beads (refractive index: 1.66), melamine-formaldehyde condensates (refractive index: 1.66), polycarbonate beads (refractive index: 1.57), and polyethylene beads (refractive index: 1.50).

Examples of the inorganic filler include amorphous silica beads and inorganic silica beads having a specific shape such as a sphere.

These fillers may be used alone or two or more of these may be used in combination.

The filler is preferably at least one selected from the group consisting of styrene-acrylic copolymer beads, polystyrene beads, and acrylic beads. More preferable are styrene-acrylic copolymer beads in terms of easier formation of the surface roughness and easier adjustment of the refractive index.

In order to increase the contrast, the amount of the styrene-acrylic copolymer beads is preferably 20 parts by mass or less for each 100 parts by mass of the total of the binder resin and the chain-like inorganic fine particles. Here, the difference in the refractive index between the styrene-acrylic copolymer beads and the binder resin is 0.05 or less.

The refractive index may be measured by directly measuring a face of a sample using an Abbe refractometer. Here, the face may be that of a material itself, or a sectional face of filler or binder in a produced anti-glare film, or a face of sliced filler or binder chip taken out of the film. The refractive index may also be measured quantitatively by using a Cargille reagent (e.g., Becke method), or a method by directly measuring the anti-glare film through measurement of laser interference or of the spectral reflectance spectrum or spectroscopic ellipsometry of the anti-glare film.

The filler has an average particle size of preferably 1 to 10 μm. An average particle size of less than 1 μm may increase the aggregate property of the particles and cause difficulty in forming fine and uniformed surface roughness. An average particle size of more than 10 μm may increase the coating thickness, thereby causing curls and cracks. The average particle size is more preferably 1.5 to 6 μm.

The particle size of the filler in the anti-glare film, which is formed by applying a composition for an anti-glare layer thereto and then curing, may be measured by, for example, taking a transmission image of a photomicrograph at a 200× to 1000× magnification and analyzing the particle size in the image with, for example, an analysis software. The average particle size is defined as an average of the particle sizes of 10 or more particles.

The amount of the filler in the anti-glare layer is preferably 5 to 25% by mass. An amount of less than 5% by mass may deteriorate the anti-glare property. An amount of more than 25% by mass may deteriorate the contrast.

The amount of the filler is more preferably 7 to 20% by mass.

The anti-glare layer preferably contains a leveling agent. A leveling agent enables easier formation of the desired surface roughness.

Examples of the leveling agent include fluorine-based leveling agents, silicone-based leveling agents, and acrylic leveling agents. Preferable among these are silicone-based leveling agents in terms of imparting intended effects with a small amount.

The amount of the leveling agent in the anti-glare layer is preferably 0.01 to 5.0% by mass. An amount of less than 0.01% by mass may cause coating defects (e.g., Benard cells) and coating undulation, failing to achieve the desired surface roughness. An amount of more than 5.0% by mass causes repellent defects starting from the particles, possibly failing to achieve the desired surface roughness. The amount of the leveling agent is more preferably 0.02 to 3.0% by mass.

The anti-glare layer may further contain other components in addition to the mentioned components according to need. Examples of the other components include resins not mentioned in the above, thermal polymerization initiators, ultraviolet absorbers, photo-polymerization initiators, light stabilizers, crosslinking agents, curing agents, polymerization accelerators, viscosity modifiers, antistatic agents, antioxidants, antifouling agents, slip agents, refractive index modifiers, and dispersants. Known products of these are usable.

The surface roughness of the anti-glare layer may be formed by using a composition containing a filler, phase separation of a resin, or embossing.

Particularly preferable method for forming the surface roughness of the anti-glare layer is the method of using the composition for an anti-glare layer containing a filler.

The surface roughness of the anti-glare layer is not particularly limited as long as it gives anti-glare property, and known surface roughness may be applicable.

The anti-glare layer preferably has a layer thickness of 3 to 10 μm. A layer thickness of smaller than 3 μm may fail to achieve appropriate anti-glare property. A layer thickness of greater than 10 μm may cause curls and cracks. The layer thickness of the anti-glare layer is more preferably 3 to 6 μm.

The layer thickness means the average thickness which is defined as an average of the thicknesses at any ten points selected by observing the cross section of the anti-glare film using an electron microscope (SEM, TEM, STEM).

The anti-glare layer may be formed from a composition for an anti-glare layer, in which the chain-like inorganic fine particles, the binder resin, and the other optional components such as the filler are mixed and dispersed in a solvent.

The mixing and dispersing may be carried out using a known device such as a paint shaker, a bead mill, or a kneader.

Examples of the solvent include alcohols (e.g., methanol, ethanol, propanol, isopropanol, n-butanol, s-butanol, t-butanol, benzyl alcohol), ketones (e.g., acetone, methyl ethyl ketone, methyl isobutyl ketone, cyclopentanone, cyclohexanone, heptanone, diisobutyl ketone, diethyl ketone), aliphatic hydrocarbons (e.g., hexane, cyclohexane), halogenated hydrocarbons (e.g., methylene chloride, chloroform, carbon tetrachloride), aromatic hydrocarbon (e.g., benzene, toluene, xylene), amides (e.g., dimethylformamide, dimethylacetamide, n-methylpyrrolidone), ethers (e.g., diethylether, dioxane, tetrahydrofuran), ether alcohols (e.g., 1-methoxy-2-propanol), esters (e.g., methyl acetate, ethyl acetate, butyl acetate, propylene glycol methyl ethyl acetate), and glycols (e.g., ethylene glycol, propylene glycol methyl ether). Particularly preferable solvents are toluene, methyl isobutyl ketone, propylene glycol methyl ethyl acetate, and cyclohexanone. These solvents have a comparatively slow volatilization rate, and thus tend to achieve the film structure of the claimed invention.

The composition for an anti-glare layer preferably has a viscosity of 2.0 to 7.0 mPa·s.

A viscosity within the above range enables appropriate formation of an anti-glare layer having the desired surface roughness.

The anti-glare layer may be formed by applying the composition for an anti-glare layer to a light transmitting substrate to form a coating, optionally drying the coating, and then curing the coating.

Examples of the method for applying the composition to form a coating include various known methods such as a spin coating method, a dip method, a spraying method, a die coating method, a bar coating method, a roll coater method, a meniscus coating method, a flexographic printing method, a screen printing method, and a bead coating method.

The drying may be carried out without particular limitation, and typically at 30° C. to 120° C. for 3 to 120 seconds.

The method for curing the coating may be appropriately selected according to the formulation of the composition or the like. If the composition is UV curable, for example, curing may be carried out by irradiation of the coating with UV light.

The UV irradiation is preferably performed at a dose of 40 to 300 mJ/cm$^2$, for example.

The anti-glare film of the claimed invention includes a light transmitting substrate.

A preferable light transmitting substrate has smoothness and heat resistance and is excellent in mechanical hardness.

Specific examples of the material for the light transmitting substrate are thermoplastic resins such as polyesters (polyethylene terephthalate, polyethylene naphthalate), cellulose triacetate, cellulose diacetate, cellulose acetate butyrate, polyamide, polyimide, polyethersulfone, polysulfone, polypropylene, polymethylpentene, polyvinyl chloride, polyvinyl acetal, polyetherketone, polymethyl methacrylate, polycarbonate, and polyurethane. Preferable among these are polyesters (polyethylene terephthalate, polyethylene naphthalate) and triacetylcellulose.

The light transmitting substrate may also be a film of an amorphous olefin polymer having an alicyclic structure (Cyclo-Olefin-Polymer: COP). Such a substrate is formed from a norbornene polymer, a cyclic olefin polymer having a single ring, a cyclic conjugated diene polymer, or a vinyl alicyclic hydrocarbon polymer resin. Specific examples are ZEONEX and ZEONOR (norbornene resins) produced by ZEON CORPORATION; SUMILITE FS-1700 produced by Sumitomo Bakelite Co., Ltd.; ARTON (modified norbornene resin) produced by JSR Corporation; APEL (cyclic olefin copolymer) produced by Mitsui Chemicals, Inc.; Topas (cyclic olefin copolymer) produced by Ticona; and OPTOREZ OZ-1000 series (alicyclic acrylic resin) produced by Hitachi Chemical Co., Ltd. Preferable examples as an alternative substrate of triacetyl cellulose include FV series (films having a low birefringence and a low light elastic modulus) produced by Asahi Kasei Chemicals Corporation.

The light transmitting substrate is preferably the thermoplastic resin which is in a flexible film state. Alternatively, a plate of the thermoplastic resin or a glass plate may be used for applications requiring curability.

The light transmitting substrate preferably has a thickness of 10 to 300 μm. More preferably, the upper limit thereof is 200 μm and the lower limit is 15 μm. If the light transmitting substrate is a plate, the thickness may differ from the above range.

The light transmitting substrate may be coated with, for increasing adhesion during forming an anti-glare layer on the substrate, an anchoring agent or a coating called a primer in advance, or may be exposed to a physical treatment such as a corona discharge treatment or an oxidation treatment.

The anti-glare film of the claimed invention may further include other optional layers in addition to the anti-glare layer and the light transmitting substrate. Examples of the other optional layers include antistatic layers, antifouling layers, high-refractive-index layers, middle-refractive-index layers, and low-refractive-index layers. These layers may be produced by mixing resins and solvents with known agents such as antistatic agents, low-refractive-index agents, high-refractive-index agents, and antifouling agents, and then forming the layers by a known method.

The anti-glare film of the claimed invention has a hardness of preferably 2H or harder, and more preferably 3H or harder in the pencil hardness test (load: 4.9 N) in conformity with JIS K5600-5-4 (1999).

When the surface of the anti-glare film of the claimed invention is scratched back and forth ten times with #0000 steel wool (BONSTAR SALES Co., Ltd.) at a friction load of 4.9 N/cm$^2$, the surface coating preferably shows no peeling. More preferably, the surface coating shows no peeling after the similar ten scratches at a friction load of 6.86 N/cm$^2$.

The anti-glare film of the claimed invention preferably has a certain flexibility to prevent cracks during production or use. Specifically, the anti-glare film preferably shows no cracks in a mandrel test using a mandrel rod with a diameter of 8 mm or less.

The anti-glare film of the claimed invention preferably has a haze of 30% or lower. A haze of higher than 30% may deteriorate color reproducibility and visibility and fail to achieve the desired contrast when the film is disposed on the display surface. The haze is more preferably 1 to 30%.

The haze may be measured by a method in conformity with JISK-7136 using a haze/transmittance meter HM-150

(produced by Murakami Color Research Laboratory Co., Ltd.). The substrate is faced toward the light source for the measurement.

The anti-glare film of the claimed invention has an inner haze of preferably 20% or lower, more preferably 15% or lower, for achieving higher image contrast.

An inner haze of higher than 20% may cause stray light and too much internal scattering when the anti-glare film is disposed on a display surface, possibly deteriorating color reproducibility and visibility and failing to achieve the desired contrast.

The inner haze may be measured by the following method. A dilution of a resin is prepared by diluting a resin such as pentaerythritol triacrylate (containing a resin component such as monomer or oligomer) with toluene or the like to have a solids content of 60%. The dilution is applied to projections and depressions of the outermost of the anti-glare film with a wire bar to have an 8-μm dried layer. Projections and depressions of the anti-glare layer are thereby leveled off, resulting in a flat layer. If the composition for forming the anti-glare film contains a leveling agent or the like, which tends to repel a recoating agent and impart water-repellency, the anti-glare film had better be exposed to a hydrophilic treatment in advance by saponification (the film is immersed in a 2-mol/l-NaOH (or KOH) solution at 55° C. for three minutes, rinsed with water, wiped with Kimwipe to remove water drops completely, and then dried in a 50° C. oven for one minute).

The flat-surfaced anti-glare film has no haze caused by surface roughness and has an inner haze only. The haze of the flat-surfaced anti-glare film thus may be regarded as the inner haze.

The haze value may be measured in accordance with JIS K-7136. Examples of the device for the measurement include a haze/transmittance meter HM-150 (produced by Murakami Color Research Laboratory Co., Ltd.). The substrate is faced toward the light source for the measurement.

The anti-glare film of the claimed invention may be produced by forming, on a light transmitting substrate, an anti-glare layer formed from a composition for an anti-glare layer containing chain-like inorganic fine particles and a binder resin.

As examples of the material and method for forming the composition for the anti-glare layer in the method for an anti-glare film of the claimed invention, the same as those listed for the forming of the anti-glare layer may be mentioned.

Another aspect of the claimed invention is a polarizer containing a polarizing element, including the anti-glare film of the claimed invention. Here, the anti-glare film includes a light transmitting substrate, and the side of the light transmitting substrate is disposed on the surface of the polarizing element by bonding or the like.

The polarizing element is not particularly limited, and examples thereof include polyvinyl alcohol films, polyvinyl formal films, polyvinyl acetal films, and ethylene-vinyl acetate copolymer saponified films, all of which are dyed with iodine or the like and then stretched. In lamination of the polarizing element and the anti-glare film of the claimed invention, the light transmitting substrate is preferably subjected to saponification. Saponification may give better adhesion and antistatic effect.

Still another aspect of the claimed invention is an image display device including the anti-glare film or the polarizer. Examples of the image display device include LCDs, PDPs, FEDs, ELDs (organic ELs, inorganic ELs), CRTs, touch panels, electronic paper displays, and tablet computers.

An LCD, which is a typical example of the image display device, includes a transparent display and a light source apparatus illuminating the transparent display from the backside. If the image display device of the claimed invention is an LCD, the anti-glare film of the claimed invention or the polarizer of the claimed invention is formed on the surface of the transparent display.

If the image display device of the claimed invention is a liquid crystal display device including the anti-glare film of the claimed invention, the light from the light source apparatus illuminates the anti-glare film from the downside (substrate side). An STN liquid crystal display device may include a retarder disposed between a liquid crystal display element and a polarizer. Such a liquid crystal display device may optionally have an adhesive layer between the respective layers.

A PDP, which is one of the above image display devices, includes a front side glass substrate and a backside glass substrate facing the front side glass substrate. Discharge gas is filled between the substrates. If the image display device of the claimed invention is a PDP, the anti-glare film described above is disposed on the surface of the front side glass substrate or a front plate (glass substrate or film substrate) thereof.

The image display device may be an ELD device in which a light emitter (e.g., zinc sulfide, diamine materials) that emits light when a voltage is applied is deposited on a glass substrate and an image is displayed by controlling the voltage applied to the substrate; or a CRT in which electric signals are converted into light to generate an image visible to the human eye. In these devices, the anti-glare film described above is provided on the outermost surface or on the surface of the front plate of the display device.

Any anti-glare film of the claimed invention may be used for displays such as televisions, computers, and word processors. In particular, the anti-glare film of the claimed invention may be suitably used for the surfaces of displays for high-resolution images, such as CRTs, liquid crystal panels, PDPs, ELDs, touch panels, electronic paper displays, and tablet computers.

Advantageous Effects of Invention

This configuration of the anti-glare film of the claimed invention achieves high pencil hardness, high scratch resistance, and excellent anti-glare property. Image display devices containing the anti-glare film of the claimed invention may provide enhanced image contrast.

The anti-glare film of the claimed invention thus may be appropriately used for displays such as cathode ray tube display devices (CRTs), liquid crystal displays (LCDs), plasma displays (PDPs), electroluminescence displays (ELDs), touch panels, electronic paper displays, tablet computers, and especially for high definition displays.

BRIEF DESCRIPTION OF DRAWINGS

FIG. 5 shows an explanatory drawing of the method for measuring θa.

DESCRIPTION OF EMBODIMENTS

The claimed invention is further described in the following referring to examples and comparative examples which do not intend to limit the claimed invention.

The terms "part" and "%" in the below are expressed by mass unless otherwise noted.

Example 1

A light transmitting substrate (thickness: 40 μm, triacetyl cellulose resin film under the trade name of KC4UYW, produced by KONICA MINOLTA, INC.) was prepared. A composition for an anti-glare layer 1 prepared according to the following formulation was applied to one surface of the light transmitting substrate to have a 6.0 μm film thickness (when dried), and thus forming a coating. The coating was then dried in a 70° C. heat oven for 60 seconds to evaporate the solvents in the coating. The coating was cured by irradiation with UV light at a 120 mJ/cm$^2$ dose, and thus forming an anti-glare layer. Thereby the anti-glare film of Example 1 was produced.

<Composition for Anti-Glare Layer 1>

Chain-like silica: trade name of V-8803 produced by JGC Catalysts and Chemicals Ltd., average primary particle size of 25 nm, 31 parts by mass Organic filler A: Techpolymer SSX produced by SEKISUI PLASTICS Co., Ltd., styrene-acrylic copolymer, average particle size of 5.0 μm, refractive index of 1.52, 20 parts by mass Organic filler B: Techpolymer SSX produced by SEKISUI PLASTICS Co., Ltd., styrene-acrylic copolymer, average particle size of 3.5 μm, refractive index of 1.52, 3 parts by mass Binder resin A: pentaerythritol triacrylate under the trade name of PETA, produced by Nippon Kayaku Co., Ltd., 36 parts by mass Binder resin C: isocyanuric acid EO-modified triacrylate under the trade name of M-313, produced by Toagosei Co., Ltd., 22 parts by mass Binder resin E: PMMA polymer under the trade name of HRAG acryl, produced by DNP Fine Chemicals Co., Ltd. (weight average molecular weight: 75000), 11 parts by mass Irgacure 184: product of BASF Japan, Ltd., 6 parts by mass Polyether-modified silicone oil: trade name of TSF4460 produced by Momentive Performance Materials Inc., 0.1 parts by mass Toluene: 60 parts by mass Methyl isobutyl ketone (MIBK): 40 parts by mass Example 2

An anti-glare film was produced in the same manner as in Example 1, except that a composition for an anti-glare layer 2 having the following formulation was used instead of the composition for an anti-glare layer 1.

<Composition for Anti-Glare Layer 2

Chain-like silica: trade name of V-8803 produced by JGC Catalysts and Chemicals Ltd., average primary particle size of 25 nm, 36 parts by mass Organic filler A: Techpolymer SSX produced by SEKISUI PLASTICS Co., Ltd., styrene-acrylic copolymer, average particle size of 5.0 μm, refractive index of 1.52, 20 parts by mass Organic filler B: Techpolymer SSX produced by SEKISUI PLASTICS Co., Ltd., styrene-acrylic copolymer, average particle size of 3.5 μm, refractive index of 1.52, 3 parts by mass Binder resin A: pentaerythritol triacrylate under the trade name of PETA, produced by Nippon Kayaku Co., Ltd., 31 parts by mass Binder resin C: isocyanuric acid EO-modified triacrylate under the trade name of M-313, produced by Toagosei Co., Ltd., 22 parts by mass Binder resin E: PMMA polymer (weight average molecular weight: 75000) under the trade name of HRAG acryl, produced by DNP Fine Chemicals Co., Ltd., 11 parts by mass Irgacure 184: product of BASF Japan, Ltd., 6 parts by mass Polyether-modified silicone oil: trade name of TSF4460 produced by Momentive Performance Materials Inc., 0.1 parts by mass Toluene: 60 parts by mass Methyl isobutyl ketone (MIBK): 40 parts by mass Example 3

An anti-glare film was produced in the same manner as in Example 1, except that a composition for an anti-glare layer 3 having the following formulation was used instead of the composition for an anti-glare layer 1.

<Composition for Anti-Glare Layer 3>

Chain-like silica: trade name of V-8803 produced by JGC Catalysts and Chemicals Ltd., average primary particle size of 25 nm, 36 parts by mass Organic filler A: Techpolymer SSX produced by SEKISUI PLASTICS Co., Ltd., styrene-acrylic copolymer, average particle size of 5.0 μm, refractive index of 1.52, 11 parts by mass Organic filler C: Techpolymer SSX produced by SEKISUI PLASTICS Co., Ltd., styrene-acrylic copolymer, average particle size of 3.5 μm, refractive index of 1.55, 6 parts by mass Binder resin A: pentaerythritol triacrylate under the trade name of PETA, produced by Nippon Kayaku Co., Ltd., 31 parts by mass Binder resin C: isocyanuric acid EO-modified triacrylate under the trade name of M-313, produced by Toagosei Co., Ltd., 22 parts by mass Binder resin E: PMMA polymer under the trade name of HRAG acryl (weight average molecular weight: 75000), produced by DNP Fine Chemicals Co., Ltd., 11 parts by mass Irgacure 184: product of BASF Japan, Ltd., 6 parts by mass Polyether-modified silicone oil: trade name of TSF4460 produced by Momentive Performance Materials Inc., 0.1 parts by mass Toluene: 60 parts by mass Methyl isobutyl ketone (MIBK): 40 parts by mass Example 4

An anti-glare film was produced in the same manner as in Example 1, except that a composition for an anti-glare layer 4 having the following formulation was used instead of the composition for an anti-glare layer 1 and that the film thickness (when dried) of the anti-glare layer was changed to 3.0 μm.

<Composition for Anti-Glare Layer 4>

Chain-like silica: trade name of V-8803 produced by JGC Catalysts and Chemicals Ltd., average primary particle size of 25 nm, 40 parts by mass Organic filler D: SX series produced by Soken Chemical & Engineering Co., Ltd., styrene beads, average particle size of 3.5 μm, refractive index of 1.59, 1.25 parts by mass Inorganic filler F: amorphous silica under the trade name of EXG40-77 (D-30M), produced by Dainichiseika Color & Chemicals Mfg. Co., Ltd., average particle size of 1.5 μm, 10 parts by mass Binder resin A: pentaerythritol triacrylate under the trade name of PETA, produced by Nippon Kayaku Co., Ltd., 40 parts by mass Binder resin C: isocyanuric acid EO-modified triacrylate under the trade name of M-313, produced by Toagosei Co., Ltd., 10 parts by mass Binder resin E: PMMA polymer under the trade name of HRAG acryl (weight average molecular weight: 75000), produced by DNP Fine Chemicals Co., Ltd., 10 parts by mass Irgacure 184: product of BASF Japan, Ltd., 6 parts by mass Polyether-modified silicone oil: trade name of TSF4460 produced by Momentive Performance Materials Inc., 0.1 parts by mass Toluene: 60 parts by mass Methyl isobutyl ketone (MIBK): 40 parts by mass Example 5

An anti-glare film was produced in the same manner as in Example 1, except that a composition for an anti-glare layer 5 having the following formulation was used instead of the composition for an anti-glare layer 1.

<Composition for Anti-Glare Layer 5>

Chain-like silica: trade name of V-8803 produced by JGC Catalysts and Chemicals Ltd., average primary particle size of 25 nm, 40 parts by mass Organic filler B: Techpolymer SSX produced by SEKISUI PLASTICS Co., Ltd., styrene-acrylic copolymer, average particle size of 3.5 μm, refractive index of 1.52, 1 part by mass Organic filler E: Techpolymer SSX produced by SEKISUI PLASTICS Co., Ltd., styrene-acrylic copolymer, average particle size of 3.5 μm, refractive index of 1.50, 11 parts by mass Binder resin A: pentaerythritol triacrylate under the trade name of PETA, produced by Nippon Kayaku Co., Ltd., 30 parts by mass Binder resin D: acrylic resin containing methacrylic acid, under the trade name of RS29-266, produced by DIC Corporation, weight average molecular weight of 8300, 30 parts by mass Irgacure 184: product of BASF Japan, Ltd., 6 parts by mass Polyether-modified silicone oil: trade name of TSF4460 produced by Momentive Performance Materials Inc., 0.1 parts by mass Toluene: 60 parts by mass Methyl isobutyl ketone (MIBK): 40 parts by mass Example 6

An anti-glare film was produced in the same manner as in Example 1, except that a composition for an anti-glare layer 6 having the following formulation was used instead of the composition for an anti-glare layer 1.

<Composition for Anti-Glare Layer 6>

Chain-like silica: trade name of V-8803 produced by JGC Catalysts and Chemicals Ltd., average primary particle size of 25 nm, 45 parts by mass Organic filler B: Techpolymer SSX produced by SEKISUI PLASTICS Co., Ltd., styrene-acrylic copolymer, average particle size of 3.5 μm, refractive index of 1.52, 1 part by mass Organic filler E: Techpolymer SSX produced by SEKISUI PLASTICS Co., Ltd., styrene-acrylic copolymer, average particle size of 3.5 μm, refractive index of 1.50, 11 parts by mass Binder resin A: pentaerythritol triacrylate under the trade name of PETA, produced by Nippon Kayaku Co., Ltd., 25 parts by mass Binder resin D: acrylic resin containing methacrylic acid, under the trade name of RS29-266, produced by DIC Corporation, weight average molecular weight of 8300, 30 parts by mass Irgacure 184: product of BASF Japan, Ltd., 6 parts by mass Polyether-modified silicone oil: trade name of TSF4460 produced by Momentive Performance Materials Inc., 0.1 parts by mass Toluene: 60 parts by mass Methyl isobutyl ketone (MIBK): 40 parts by mass Example 7

An anti-glare film was produced in the same manner as in Example 1, except that a composition for an anti-glare layer 7 having the following formulation was used instead of the composition for an anti-glare layer 1.

<Composition for Anti-Glare Layer 7>

Chain-like silica: trade name of V-8803 produced by JGC Catalysts and Chemicals Ltd., average primary particle size of 25 nm, 60 parts by mass Organic filler B: Techpolymer SSX produced by SEKISUI PLASTICS Co., Ltd., styrene-acrylic copolymer, average particle size of 3.5 μm, refractive index of 1.52, 1 part by mass Organic filler E: Techpolymer SSX produced by SEKISUI PLASTICS Co., Ltd., styrene-acrylic copolymer, average particle size of 3.5 μm, refractive index of 1.50, 11 parts by mass Binder resin A: pentaerythritol triacrylate under the trade name of PETA, produced by Nippon Kayaku Co., Ltd., 10 parts by mass Binder resin D: acrylic resin containing methacrylic acid, under the trade name of RS29-266, produced by DIC Corporation, weight average molecular weight of 8300, 30 parts by mass Irgacure 184: product of BASF Japan, Ltd., 6 parts by mass Polyether-modified silicone oil: trade name of TSF4460 produced by Momentive Performance Materials Inc., 0.1 parts by mass Toluene: 60 parts by mass Methyl isobutyl ketone (MIBK): 40 parts by mass

Comparative Example 1

An anti-glare film was produced in the same manner as in Example 1, except that a composition for an anti-glare layer 8 having the following formulation was used instead of the composition for an anti-glare layer 1 and that the film thickness (when dried) was changed to 3.0 μm.

<Composition for Anti-Glare Layer 8>

Inorganic filler F: amorphous silica under the trade name of EXG40-77 (D-30M), produced by Dainichiseika Color & Chemicals Mfg. Co., Ltd., average particle size of 1.5 μm, 9 parts by mass Binder resin A: pentaerythritol triacrylate under the trade name of PETA, produced by Nippon Kayaku Co., Ltd., 100 parts by mass Irgacure 184: product of BASF Japan, Ltd., 6 parts by mass Polyether-modified silicone oil: trade name of TSF4460 produced by Momentive Performance Materials Inc., 0.1 parts by mass Toluene: 80 parts by mass Methyl isobutyl ketone (MIBK): 20 parts by mass

Comparative Example 2

An anti-glare film was produced in the same manner as in Example 1, except that a composition for an anti-glare layer 9 having the following formulation was used instead of the composition for an anti-glare layer 1.

<Composition for Anti-Glare Layer 9>

Organic filler A: Techpolymer SSX produced by SEKISUI PLASTICS Co., Ltd., styrene-acrylic copolymer, average particle size of 5.0 μm, refractive index of 1.52, 20 parts by mass Organic filler B: Techpolymer SSX produced by SEKISUI PLASTICS Co., Ltd., styrene-acrylic copolymer, average particle size of 3.5 μm, refractive index of 1.52, 3 parts by mass Binder resin A: pentaerythritol triacrylate under the trade name of PETA, produced by Nippon Kayaku Co., Ltd., 67 parts by mass Binder resin C: isocyanuric acid EO-modified triacrylate under the trade name of M-313, produced by Toagosei Co., Ltd., 22 parts by mass Binder resin E: PMMA polymer (weight average molecular weight: 75000) under the trade name of HRAG acryl, produced by DNP Fine Chemicals Co., Ltd., 11 parts by mass Irgacure 184: product of BASF Japan, Ltd., 6 parts by mass Polyether-modified silicone oil: trade name of TSF4460 produced by Momentive Performance Materials Inc., 0.1 parts by mass Toluene: 60 parts by mass Methyl isobutyl ketone (MIBK): 40 parts by mass

Comparative Example 3

An anti-glare film was produced in the same manner as in Example 1, except that a composition for an anti-glare layer 10 having the following formulation was used instead of the composition for an anti-glare layer 1.

<Composition for Anti-Glare Layer 10>

Chain-like silica: trade name of V-8803 produced by JGC Catalysts and Chemicals Ltd., average primary particle size of 25 nm, 27 parts by mass Organic filler A: Techpolymer SSX produced by SEKISUI PLASTICS Co., Ltd., styrene-acrylic copolymer, average particle size of 5.0 μm, refractive index of 1.52, 20 parts by mass Organic filler B: Techpolymer SSX produced by SEKISUI PLASTICS Co., Ltd., styrene-acrylic copolymer, average particle size of 3.5 μm, refractive index of 1.52, 3 parts by mass Binder resin A: pentaerythritol triacrylate under the trade name of PETA, produced by Nippon Kayaku Co., Ltd., 40 parts by mass Binder resin C: isocyanuric acid EO-modified triacrylate under the trade name of M-313, produced by Toagosei Co., Ltd., 22 parts by mass Binder resin E: PMMA polymer (weight average molecular weight: 75000) under the trade name of HRAG acryl, produced by DNP Fine Chemicals Co., Ltd., 11 parts by mass Irgacure 184: product of BASF Japan, Ltd., 6 parts by mass Polyether-modified silicone oil: trade name of TSF4460 produced by Momentive Performance Materials Inc., 0.1 parts by mass Toluene: 60 parts by mass Methyl isobutyl ketone (MIBK): 40 parts by mass

Comparative Example 4

An anti-glare film was produced in the same manner as in Example 1, except that a composition for an anti-glare layer 11 having the following formulation was used instead of the composition for an anti-glare layer 1.

<Composition for Anti-Glare Layer 11>

Chain-like silica: trade name of V-8803 produced by JGC Catalysts and Chemicals Ltd., average primary particle size of 25 nm, 65 parts by mass Organic filler B: Techpolymer SSX produced by SEKISUI PLASTICS Co., Ltd., styrene-acrylic copolymer, average particle size of 3.5 μm, refractive index of 1.52, 1 part by mass Organic filler E: Techpolymer SSX produced by SEKISUI PLASTICS Co., Ltd., styrene-acrylic copolymer, average particle size of 3.5 μm, refractive index of 1.50, 11 parts by mass Binder resin A: pentaerythritol triacrylate under the trade name of PETA, produced by Nippon Kayaku Co., Ltd., 5 parts by mass Binder resin D: acrylic resin containing methacrylic acid, under the trade name of RS29-266, produced by DIC Corporation, weight average molecular weight of 8300, 30 parts by mass Irgacure 184: product of BASF Japan, Ltd., 6 parts by mass Polyether-modified silicone oil: trade name of TSF4460 produced by Momentive Performance Materials Inc., 0.1 parts by mass Toluene: 60 parts by mass Methyl isobutyl ketone (MIBK): 40 parts by mass

Comparative Example 5

An anti-glare film was produced in the same manner as in Comparative Example 1 except that the film thickness of the anti-glare layer was changed to 11.0 μm.

Comparative Example 6

An anti-glare film was produced in the same manner as in Example 1, except that a composition for an anti-glare layer 12 having the following formulation was used instead of the composition for an anti-glare layer 1.

<Composition for Anti-Glare Layer 12>

Spherical silica: trade name of DP-1117SIV produced by JGC Catalysts and Chemicals Ltd., average primary particle size of 25 nm, 31 parts by mass Organic filler A: Techpolymer SSX produced by SEKISUI PLASTICS Co., Ltd., styrene-acrylic copolymer, average particle size of 5.0 µm, refractive index of 1.52, 20 parts by mass Organic filler B: Techpolymer SSX produced by SEKISUI PLASTICS Co., Ltd., styrene-acrylic copolymer, average particle size of 3.5 µm, refractive index of 1.52, 3 parts by mass Binder resin A: pentaerythritol triacrylate under the trade name of PETA, produced by Nippon Kayaku Co., Ltd., 36 parts by mass Binder resin C: isocyanuric acid EO-modified triacrylate under the trade name of M-313, produced by Toagosei Co., Ltd., 22 parts by mass Binder resin E: PMMA polymer (weight average molecular weight: 75000) under the trade name of HRAG acryl, produced by DNP Fine Chemicals Co., Ltd., 11 parts by mass Irgacure 184: product of BASF Japan, Ltd., 6 parts by mass Polyether-modified silicone oil: trade name of TSF4460 produced by Momentive Performance Materials Inc., 0.1 parts by mass Toluene: 60 parts by mass Methyl isobutyl ketone (MIBK): 40 parts by mass Comparative Example 7

An anti-glare film was produced in the same manner as in Example 1, except that a composition for an anti-glare layer 13 having the following formulation was used instead of the composition for an anti-glare layer 1 and that the film thickness was changed to 11.0 µm.

<Composition for Anti-Glare Layer 13>

Spherical silica: trade name of DP-1117SIV produced by JGC Catalysts and Chemicals Ltd., average primary particle size of 25 nm, 40 parts by mass Organic filler A: Techpolymer SSX produced by SEKISUI PLASTICS Co., Ltd., styrene-acrylic copolymer, average particle size of 5.0 µm, refractive index of 1.52, 20 parts by mass Organic filler B: Techpolymer SSX produced by SEKISUI PLASTICS Co., Ltd., styrene-acrylic copolymer, average particle size of 3.5 µm, refractive index of 1.52, 3 parts by mass Binder resin A: pentaerythritol triacrylate under the trade name of PETA, produced by Nippon Kayaku Co., Ltd., 36 parts by mass Binder resin C: isocyanuric acid EO-modified triacrylate under the trade name of M-313, produced by Toagosei Co., Ltd., 22 parts by mass Binder resin E: PMMA polymer (weight average molecular weight: 75000) under the trade name of HRAG acryl, produced by DNP Fine Chemicals Co., Ltd., 11 parts by mass Irgacure 184: product of BASF Japan, Ltd., 6 parts by mass Polyether-modified silicone oil: trade name of TSF4460 produced by Momentive Performance Materials Inc., 0.1 parts by mass Toluene: 60 parts by mass Methyl isobutyl ketone (MIBK): 40 parts by mass Comparative Example 8

An anti-glare film was produced in the same manner as in Example 1, except that a composition for an anti-glare layer 14 having the following formulation was used instead of the composition for an anti-glare layer 1 and that the film thickness was changed to 3.0 µm.

<Composition for Anti-Glare Layer 14>

Spherical silica: trade name of DP-1117SIV produced by JGC Catalysts and Chemicals Ltd., average primary particle size of 25 nm, 65 parts by mass Organic filler B: Techpolymer SSX produced by SEKISUI PLASTICS Co., Ltd., styrene-acrylic copolymer, average particle size of 3.5 µm, refractive index of 1.52, 1 part by mass Organic filler E: Techpolymer SSX produced by SEKISUI PLASTICS Co., Ltd., styrene-acrylic copolymer, average particle size of 3.5 µm, refractive index of 1.50, 11 parts by mass Binder resin A: pentaerythritol triacrylate under the trade name of PETA, produced by Nippon Kayaku Co., Ltd., 5 parts by mass Binder resin D: acrylic resin containing methacrylic acid, under the trade name of RS29-266, produced by DIC Corporation, weight average molecular weight of 8300, 30 parts by mass Irgacure 184: product of BASF Japan, Ltd., 6 parts by mass Polyether-modified silicone oil: trade name of TSF4460 produced by Momentive Performance Materials Inc., 0.1 parts by mass Toluene: 60 parts by mass Methyl isobutyl ketone (MIBK): 40 parts by mass Each anti-glare film obtained in the above was evaluated for the following items. Table 1 shows the results.

<Area Ratio>

In each anti-glare film, the area ratio of the chain-like inorganic fine particles in the thickness direction cross section of the anti-glare layer was determined by measuring the cross section of the film from a cross-sectional SEM photograph using an image analysis software called Win Roof (produced by Visual System Division of MITANI CORPORATION), and then binarizing the image (converting the abundance of the chain-like fine particles in terms of areas). Here, the area ratio was the average value calculated from the area ratios of any five points in the cross section of the anti-glare layer. FIGS. 1, 2, 3, and 4 show an example of the binarized SEM photograph of the thickness direction cross section of the anti-glare layer in Examples 1, 2, 5, and Comparative Example 3, respectively. These figures all show a cross-sectional photograph at a 50000× magnification, and the area surrounded by solid lines corresponds to 1 µm$^2$. The five points were selected from the region having no organic particles, not including the outermost surface, and having a depth direction of 1.5 µm.

<Pencil Hardness>

Each anti-glare film was placed in a relative humidity of 60% at 25° C. for two hours for humidity control. The pencil hardness of the surface of the anti-glare layer was measured by the evaluation method of the pencil hardness in conformity with JIS K5600-5-4 (1999), using test pencils defined in JIS-S-6006 (hardness: HB to 3H) at a load of 4.9 N.

<Scratch Resistance>

The surface of the anti-glare film was scratched back and forth ten times at a friction load of 4.9 N/cm$^2$ and 6.86

N/cm² using #0000 steel wool (produced by BONSTAR SALES Co., Ltd.). The anti-glare film was visually observed for the presence of peeling of the coating and was evaluated according to the following criteria.

Excellent: No coating scratch was found at a friction load of 6.86 N/cm².

Good: Coating scratches were found at a friction load of 6.86 N/cm² although no coating scratch was found at a friction load of 4.9 N/cm².

Poor: Coating scratches were found at a friction load of 4.9 N/cm².

<Haze, Inner Haze>

The haze of each anti-glare film was measured in conformity with JIS K-7136 (haze) using a haze meter (produced by Murakami Color Research Laboratory Co., Ltd., product no.: HM-150). The inner haze thereof was measured by the method mentioned above.

<Blackness Visibility>

The backside (the side of the light transmitting substrate) of each anti-glare film was bonded to a black acryl plate using a transparent adhesive film for optical film (total light transmittance: 91% or higher, haze: 0.3% or lower, film thickness: 20 to 50 μm, example: MHM series of Nichieikako Co., Ltd.), thereby preparing a sample. The sample was placed on a horizontal plane and visually observed from various directions under a bright-room condition of 1000 Lx for evaluation according to the following criteria.

Excellent: sufficient anti-glare property with a sharp black look and no white muddying Good: sufficient anti-glare property with a sharp black look and slight white muddying Poor: sufficient anti-glare property with white muddying on the whole —: Evaluation was impossible because the film had no desired surface roughness and no anti-glare property.

<Coating Adhesion>

On the surface (the surface of the anti-glare layer) of each anti-glare film, cut lines were marked such that the film had 100 grids of 1-mm squares, and a 24-mm adhesive tape for industrial use (product of Nichiban Co., Ltd.) was attached thereto. The surface was rubbed over the tape with the unsharpened side of the blade of a cutter so that the tape adheres to the film. The tape was then rapidly peeled in the 90° C. direction. The peeling was repeated five times. The number of the squares where the coating was left on the film surface was visually counted. Only the squares the inside of which was peeled were counted while the squares only the cut line(s) of which was/were peeled were not counted.

No peeling: The number of squares with coating was 100 out of 100 squares.

Peeled: The number of squares with coating was less than 100 out of 100 squares.

<Mandrel Test>

Each anti-glare film was cut into 2.5 cm×20 cm rectangular pieces, and the rectangular pieces were wound around mandrel rods with different diameters, produced by TOYO SEIKI Co., Ltd., with the anti-glare-layer side faced outside. The rectangular pieces were visually observed using a transmitted light stand in a darkroom to observe the presence of cracks in the anti-glare layer.

In the evaluation, the diameter of the smallest mandrel rod with which the rectangular piece did not have cracks was recorded.

TABLE 1

|  | Example 1 | Example 2 | Example 3 | Example 4 | Example 5 | Example 6 | Example 7 |
|---|---|---|---|---|---|---|---|
| Area ratio of chain-shaped silica (%) | 32.0 | 42.0 | 41.2 | 54.0 | 60.0 | 76.0 | 94.0 |
| Filling rate of chain-shaped silica (%) | 44.9 | 56.3 | 56.3 | 66.7 | 66.7 | 81.8 | 150.0 |
| Pencil hardness | 2H | 3H | 3H | 3H | 3H | 3H | 3H |
| Scratch resistance | Good | Excellent | Excellent | Excellent | Excellent | Excellent | Excellent |
| Haze (%) | 23.0 | 27.0 | 29.0 | 23.0 | 1.2 | 2.1 | 5.0 |
| Blackness visibility | Good | Good | Good | Good | Excellent | Excellent | Excellent |
| Coating adhesion | No peeling | No peeling | No peeling | No peeling | No peeling | No peeling | No peeling |
| Mandrel test | 6 mm | 6 mm | 6 mm | 6 mm | 6 mm | 6 mm | 8 mm |
| Film thickness (μm) | 6.0 | 6.0 | 6.0 | 3.0 | 6.0 | 6.0 | 6.0 |
| Inner haze (%) | 10.0 | 13.0 | 20.0 | 8.0 | 0.5 | 1.3 | 4.0 |

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Area ratio of chain-shaped silica (%) | — | — | 29.0 | 95.0 | — | 33.0* | 57.0* | 95.0* |
| Filling rate of chain-shaped silica (%) | — | — | 37.0 | 185.7 | — | 44.9* | 66.7* | 185.7* |
| Pencil hardness | H | H | H | 3H | 2H | H | 2H | 3H |
| Scratch resistance | Excellent | Poor | Good | Excellent | Poor | Good | Good | Excellent |
| Haze (%) | 23.0 | 7.0 | 22.0 | 5.5 | 2.0 | 12.0 | 15.0 | 16.0 |
| Blackness visibility | Poor | — | Good | Excellent | — | — | — | Poor |
| Coating adhesion | No peeling | No peeling | No peeling | Peeled | No peeling | No peeling | No peeling | Peeled |
| Mandrel test | 6 mm | 6 mm | 6 mm | 12 mm | 10 mm | 6 mm | 10 mm | 10 mm |
| Film thickness (μm) | 3.0 | 6.0 | 6.0 | 6.0 | 11.0 | 6.0 | 11.0 | 3.0 |
| Inner haze (%) | 3.0 | 5.0 | 9.0 | 4.0 | 0.5 | 10.0 | 13.0 | 3.0 |

*The area ratio and filling rate of spherical silica are shown in Comparative Examples 6, 7, and 8.

Table 1 shows that the anti-glare films of the examples were superior in all of physical characteristics, such as pencil hardness, scratch resistant, coating adhesion, and crack prevention, and optical characteristics. In contrast, the anti-glare films of the comparative examples were not good in all of pencil hardness, scratch resistance, coating adhesion, and optical characteristics.

<Surface Roughness (Mean Spacing (Sm) of Roughness, Arithmetic Mean Roughness (Ra) of Roughness, Average Inclination Angle (θa) of Roughness)>

The mean spacing (Sm), arithmetic mean roughness (Ra), and average inclination angle (θa) of projections and depressions on the surface of the anti-glare layer of each anti-glare film of Examples 1, 2, and Comparative Example 3 were measured using a surface roughness tester SE-3400 of Kosaka Laboratory, Ltd. under the following conditions.

Figure 5:
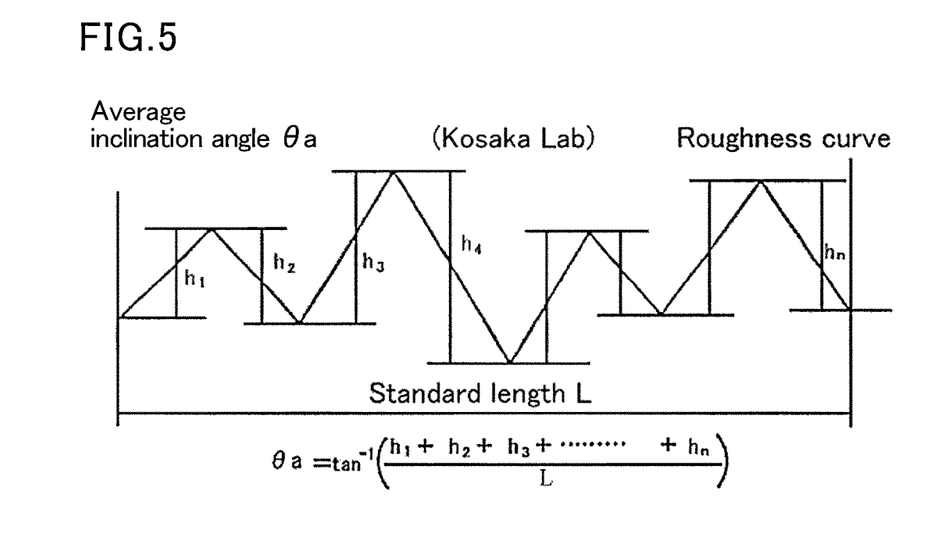

The mean spacing (Sm) and arithmetic mean roughness (Ra) of projections and depressions were determined by the method in conformity with JIS B 0601-1994. The average inclination angle (ea) of projections and depressions were determined according to the definition in the instruction manual (revised on 1995.07.20) of the surface roughness tester SE-3400 (Kosaka Laboratory, Ltd.). Specifically, the average inclination angle (θa) was determined as the arc tangent of the total heights of convex portions ($h_1+h_2+h_3+ \ldots +h_n$) in a standard length L{$\theta a=\tan^{-1}(h_1+h_2+h_3+ \ldots +h_n)/L$}, as shown in FIG. 5. Table 2 shows the results. The results clarified that increase of chain-like fine particles increases the value of ea or the like. That is, the chain-like fine particles contribute to the shape of surface roughness and the desired anti-glare property while improving the scratch resistance.

<Measuring Condition>

(1) Sensing Pin of Detecting Division for Surface Roughness

Type no.: SE2555N (2 μm sensing pin), produced by Kosaka Laboratory, Ltd., (tip radius of curvature: 2 μm, apex angle: 90°, material: diamond)

(2) Measurement Conditions of a Surface Roughness Tester

Standard length (cutoff value of roughness curve λc): 0.8 mm

Evaluation length (standard length (cutoff value λc)×5): 4.0 mm

Feed speed of sensing pin: 0.1 mm/s

TABLE 2

| | | Example 1 | Example 2 | Comparative Example 3 |
|---|---|---|---|---|
| Surface roughness | Ra (μm) | 0.145 | 0.146 | 0.145 |
| | Sm (mm) | 0.071 | 0.055 | 0.114 |
| | θa (deg) | 1.475 | 1.616 | 1.255 |

INDUSTRIAL APPLICABILITY

The anti-glare film of the claimed invention may be appropriately used for displays such as cathode ray tube display devices (CRTs), liquid crystal displays (LCDs), plasma displays (PDPs), electroluminescence displays (ELDs), touch panels, electronic paper displays, tablet computers, and especially for displays for high definition.

The invention claimed is:

1. An anti-glare film, comprising:
a light transmitting substrate; and
an anti-glare layer with surface roughness on at least one surface of the light transmitting substrate, the anti-glare layer having a film thickness of 3 to 10 μm,
the anti-glare layer comprising a binder resin, an organic filler, and chain-like inorganic fine particles dispersed in the binder resin, the chain-like inorganic fine particles occupying an area ratio of 30 to 94% of a thickness direction cross section of the anti-glare layer,
the chain-like inorganic fine particles being made of 3 to 20 spherical inorganic fine particles having an average primary particle size of 1 nm to 100 nm, the 3 to 20 spherical inorganic fine particles being connected together to form a chain,
the organic filler being selected from the group consisting of polystyrene beads, benzoguanamine-melamine-formaldehyde condensates, styrene-acrylic copolymer beads, benzoguanamine-formaldehyde condensate beads, melamine-formaldehyde condensates, polycarbonate beads, and polyethylene beads.

2. The anti-glare film according to claim 1,
wherein the area ratio of the chain-like inorganic fine particles in the thickness direction cross section of the anti-glare layer is 40 to 80%.

3. The anti-glare film according to claim 1,
wherein the chain-like inorganic fine particles have a filling rate of 40 to 150% in the anti-glare layer.

4. The anti-glare film according to claim 1,
wherein the chain-like inorganic fine particles have the average primary particle size of 1 to 90 nm.

5. The anti-glare film according to claim 1,
wherein the chain-like inorganic fine particles are chain-like silica.

6. The anti-glare film according to claim 1,
wherein the anti-glare layer is a single layer.

7. The anti-glare film according to claim 1,
wherein the anti-glare layer further comprises an inorganic filler, and
the organic filler and the inorganic filler are present in an amount of 5 to 25% by mass.

8. The anti-glare film according to claim 7,
wherein the organic filler is at least one selected from the group consisting of styrene-acrylic copolymer beads and polystyrene beads.

9. A polarizer comprising
a polarizing element, and
the anti-glare film according to claim 1, on a surface of the polarizing element.

10. An image display device comprising:
the anti-glare film according to claim 1, or
a polarizer comprising a polarizing element and the anti-glare film according to claim 1 on a surface of the polarizing element.

11. The anti-glare film according to claim 1,
wherein the organic filler has an average particle size of 1 to 10 μm.

12. The anti-glare film according to claim 1,
wherein the organic filler has a refractive index of 1.50 or more.

13. An anti-glare film, comprising:
a light transmitting substrate having a surface; and
an anti-glare layer disposed on the surface of the light transmitting substrate, wherein the anti-glare layer has a thickness of 3 to 10 μm along a thickness direction cross section of the anti-glare layer,
wherein the anti-glare layer comprising an organic filler, a binder resin, and chain-like inorganic fine particles dispersed in the binder resin, the organic filler being selected from the group consisting of polystyrene beads, benzoguanamine-melamine-formaldehyde condensates, styrene-acrylic copolymer beads, benzoguanamine-formaldehyde condensate beads, melamine-formaldehyde condensates, polycarbonate beads, and polyethylene beads, the chain-like inorganic fine particles being a chain of connected spherical inorganic fine particles, each of the spherical inorganic fine particles having an average primary particle size of 1 nm to 100 nm, and the chain-like inorganic fine particles arranged to occupy an area ratio of 30 to 94% of the thickness direction cross section of the anti-glare layer.

14. The anti-glare film according to claim 13,
wherein the area ratio of the chain-like inorganic fine particles in the thickness direction cross section of the anti-glare layer is 40 to 80%.

15. The anti-glare film according to claim 13,
wherein the chain-like inorganic fine particles have a filling rate of 40 to 150% in the anti-glare layer.

16. The anti-glare film according to claim 13,
wherein the chain-like inorganic fine particles have the average primary particle size of 1 to 90 nm.

17. The anti-glare film according to claim 13,
wherein the anti-glare layer further comprises an inorganic filler, and
the organic filler and the inorganic filler are present in an amount of 5 to 25% by mass.

18. The anti-glare film according to claim 13,
wherein the organic filler is at least one selected from the group consisting of styrene-acrylic copolymer beads and polystyrene beads.

19. The anti-glare film according to claim 13,
wherein the organic filler has an average particle size of 1 to 10 μm.

20. The anti-glare film according to claim 13,
wherein the organic filler has a refractive index of 1.50 or more.

\* \* \* \* \*